United States Patent [19]

Narazaki et al.

[11] Patent Number: 5,241,405
[45] Date of Patent: Aug. 31, 1993

[54] COVER FOR ADJUSTING THE BEND OF AN ORIGINAL

[75] Inventors: Makoto Narazaki; Kiyoomi Mitsuki; Noriyoshi Yamashita; Yoshikazu Masuda, all of Kyoto, Japan

[73] Assignee: Dainippon Screen Mfg. Co., Ltd., Kyoto, Japan

[21] Appl. No.: 718,673

[22] Filed: Jun. 21, 1991

[30] Foreign Application Priority Data

Jun. 28, 1990 [JP] Japan .................. 2-69262[U]

[51] Int. Cl.$^5$ .................. G03G 21/00; H04N 1/00
[52] U.S. Cl. .................. 358/474; 355/290; 355/295; 355/312; 355/230; 355/231; 355/233
[58] Field of Search .............. 358/254, 474, 480, 487, 358/488, 492; 355/290, 291, 295, 312, 230, 231, 233, 282

[56] References Cited

U.S. PATENT DOCUMENTS 2,689,179 9/1954 Walkup et al. .................. 355/230
5,060,019 10/1991 Fukunaga .................. 355/231

FOREIGN PATENT DOCUMENTS 51-19865 5/1976 Japan .
0012643 1/1991 Japan .................. 355/231

Primary Examiner—Edward L. Coles, Sr.
Assistant Examiner—Jerome Grant, II
Attorney, Agent, or Firm—Lowe, Price, LeBlanc & Becker

[57] ABSTRACT

The present invention relates to an image reader 3 which reads the reflected light obtained by lightening from underneath a transparency board 6 on which an image original is placed, especially a cover 30 for the image reader 3 for adjusting the bend of the image original. The cover 30 comprise a vacuum pump (not shown) for reducing the air pressure in the space formed by the transparency board 6 and a bend member 48 and an airtight member 50. Therefore the image reader 3 utilizing the cover 30 can correctly read image on both a transparency original and a reflection original, and yet be easy to manipulate when reading the reflection original.

4 Claims, 8 Drawing Sheets

COVER FOR ADJUSTING THE BEND OF AN ORIGINAL

BACKGROUND OF THE INVENTION

1. Field of the invention

The present invention relates to a cover for adjusting the bend of an image original in an image reader which reads the reflected light obtained by lightening from underneath a transparency board on which an image original is placed.

2. Description of the Prior Art

Figure 1:
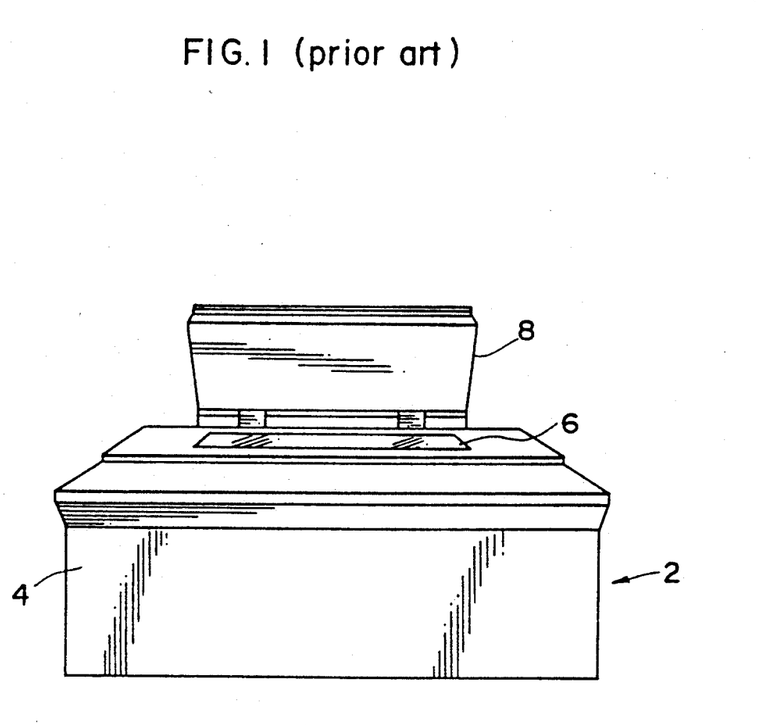
FIG. 1 is a diagram showing a prior image reader.

The detail of a prior image reader 2 is shown in FIG. 1. A transparency board 6 is located on the top of a body 4. An image is described onto an opaque base sheet such as printing paper, mechanical. The opaque paper is referred to as a "reflection original" hereinafter. The reflection original to be read is placed face down on the transparency board 6. Then, the reflection original is covered with a cover 8. A light source and a light sensor are comprised in the body 4. Reading of the image is effected by directing the beam from the light source onto the reflection original and having the reflected beam reach the light sensor.

On the other hand, it may be desired to read an image of, for example, a transparency film which is referred to as a "transparency original" hereinafter. In this case a sheet of white paper 12 is placed on the transparency original in order to reflect the beam from the light source by the sheet of white paper 12 whereby the image reader 2 can read the transparency original. The image reader 2 as shown in FIG. 1, however, can not read the image correctly because the cover 8 of image reader 2 can not adequately make the sheet of white paper 12 adhere to transparency original without any space between the two.

Figure 2A:
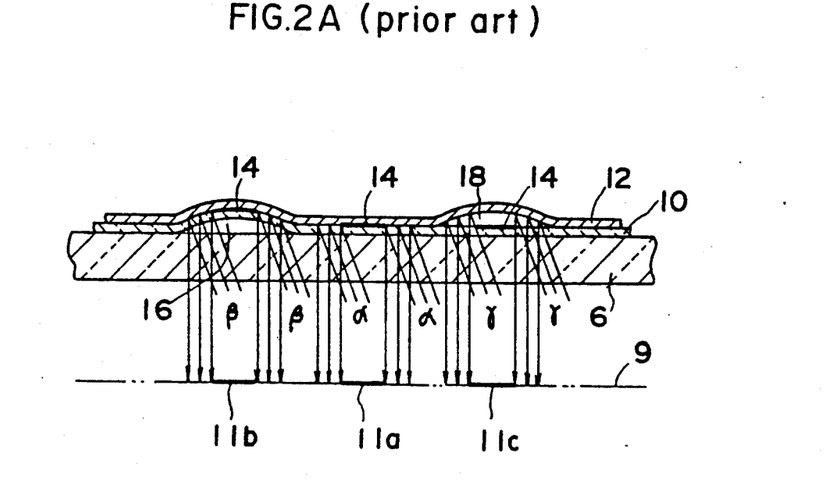
FIGS. 2A and 2B are sections for showing the problems that exist when a prior image reader reads a transparency original.

The detail of this condition is shown in FIG. 2A. A transparency original 10 to be read is placed face down on the transparency board 6 and the sheet of white paper 12 is placed on the top of the transparency original 10. Meanwhile in FIG. 2A, line images are described onto the transparency original 10. Portions 14 show line images in the transparency original 10. The beam α from the light source (not shown) passes through the transparency board 6 and portions of the transparency original 10 that show no image and it is reflected by the sheet of white paper 12 and reaches the light sensor (not shown).

Even if there is some space 16 between the transparency original 10 and the transparency board 6, the image reader 2 can read the image correctly without blurring if the space 16 is within the depth of field (see beam β).

Figure 2B:
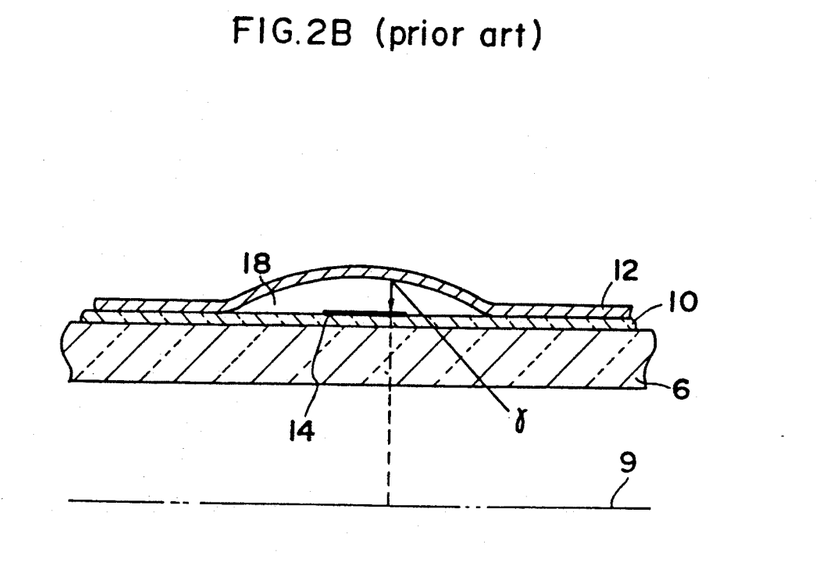

However, if there is space 18 between the transparency original 10 and the white paper 12 the image reader 2 can not read the image correctly even if the space 18 is within the depth of field, because, for example, as shown in FIG. 2B, the beam γ1 from the light source passes through the transparency original 10, is reflected by the sheet of white paper 12 and is absorbed by the image portion 14 of the transparency original 10. That is, beam γ1 from the light source which is supposed to reach the light sensor cannot reach the light sensor.

Figure 3:
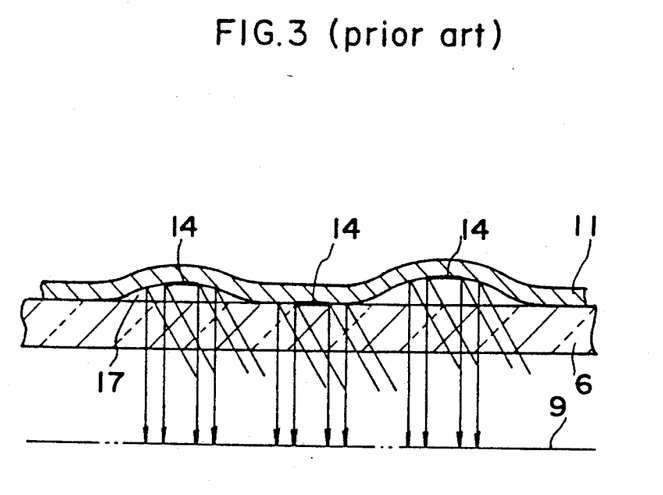
FIG. 3 is a section for showing the condition when a prior image reader reads a reflection original.

Meanwhile as shown in FIG. 3 there may also be some space 17 when reading a reflection original 11. The space 17 in FIG. 3 does not matter as long as it is within the depth of field.

In order to read the transparency original 10 correctly, it is necessary to prevent such space as space 18 shown in FIGS. 2A & 2B.

Figure 4:
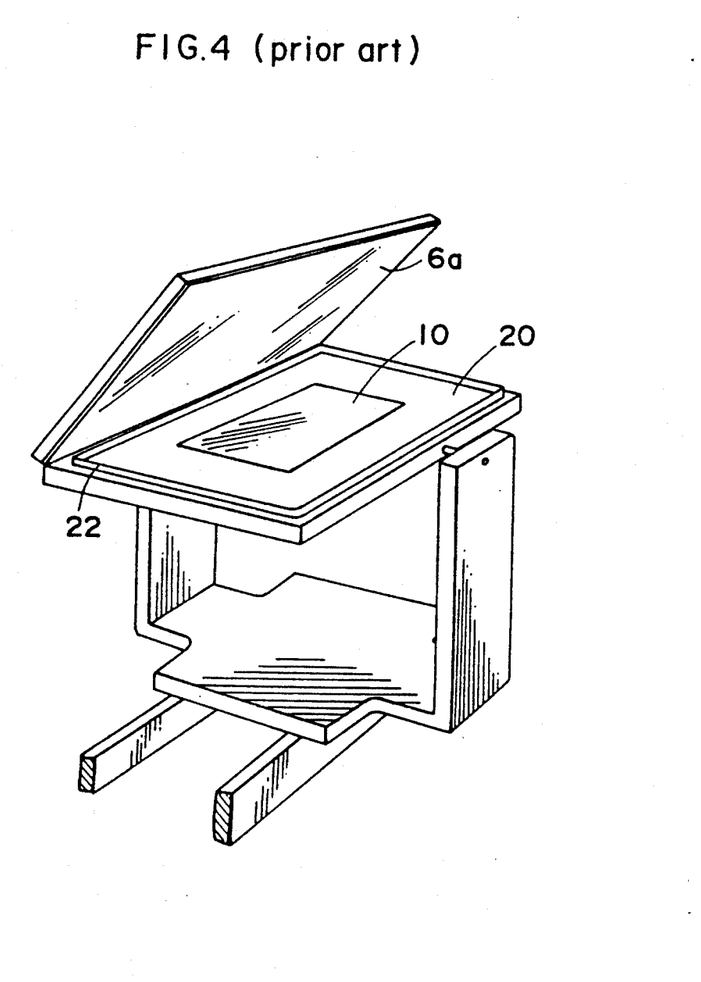
FIG. 4 is a diagram for showing a frame for a camera for the purpose of preparation for printing, disclosed in the publication of the Japanese Utility model application SHO 51-19865.
Figure 5:
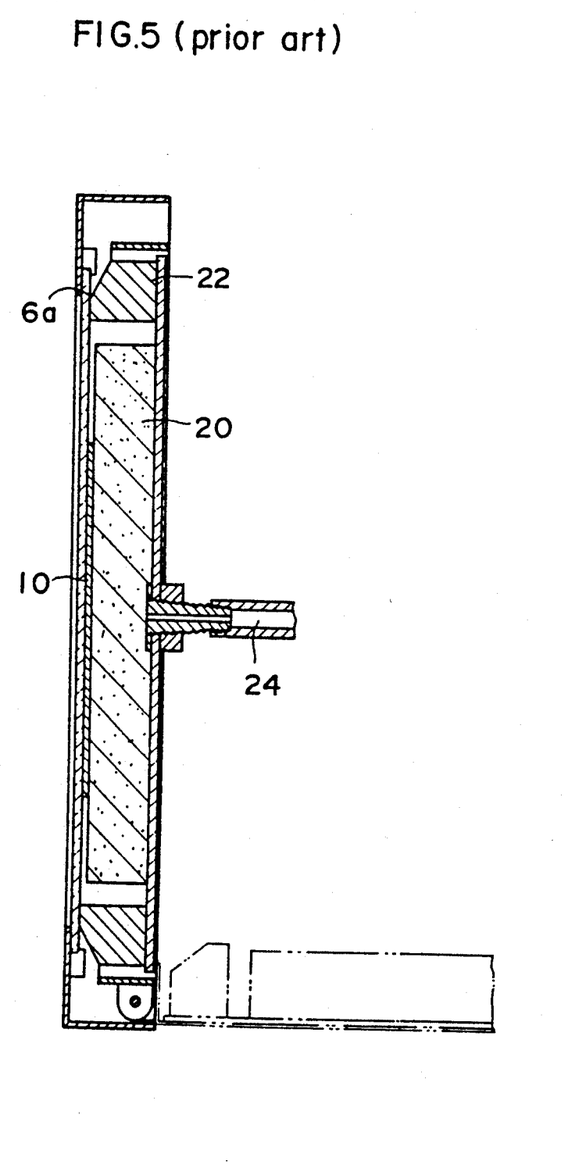
FIG. 5 is a section showing a frame for a camera for the purpose of preparation for printing, disclosed in the publication of the Japanese Utility model application SHO 51-19865.

By the way, a frame for holding an original image for use in a camera for the purpose of preparation for printing is disclosed in the publication of the Japanese Utility model application SHO 51-19865. The detail of the frame for a camera is shown in FIG. 4. A transparency original 10 is set on a resilient board 20 made of sponge or the like. Then, the transparency original 10 is covered with a transparency board 6a. A packing 22 is installed in the outskirts of the resilient board 20 so that the transparency board 6a can adhere firmly to the resilient board 20. The detail of this condition is shown in section in FIG. 5. In this condition, when a vacuum pump (not shown) connected with a rubber hose is operated, it reduces the air pressure in the space formed by the transparency board 6a and the resilient board 20 and the packing 22, and the transparency board 6a is pressed against the resilient board 20. That is, the transparency original 10 is pressed against the transparency board 6a.

However the just described pre-existing methods for adjusting the bend of an image original contain problems that will be described in the following.

Firstly, such an apparatus as shown in FIG. 1 is easy to manipulate but cannot read the image correctly, as explained in FIGS. 2A & 2B.

Secondly, when such a frame for holding an original image in a camera for the purposes of preparation for printing as shown in FIG. 4 is applied to an image reader, the image reader can read the transparency original correctly but is more difficult to manipulate than such an image reader as shown in FIG. 1; even when reading the reflection original, the operation for reducing the air pressure must be effected.

SUMMARY OF THE INVENTION

It is a primary object of the present invention to solve the problems mentioned above and to make available a cover for an image reader that will correctly read the image on both transparency copies and reflection copies and yet will be easy to manipulate.

A cover for adjusting the bend of an image original, in an image reader which reads the reflected light obtained by lighting from underneath a transparency board on which the image original is placed, comprising:

(a) an upper frame;

(b) a bend member which can bend, the lower face of which is rough and which is installed in such a way as to be capable of moving up and down in relation to the upper frame;

(c) an airtight member which is installed in the outskirts of the bend member and the lower face of which is below the lower face of the bend member;

(d) a resilient member which can move up and down and is between the upper frame and the bend member; and (e) means for reducing the air pressure in the space formed by the transparency board and the bend member and the airtight member.

A method of adjusting the bend of an image original, in an image reader which reads the reflected light obtained by lighting from underneath a transparency board on which the image original is placed, comprising:

when reading a reflection original, (a) a step for covering the reflection original set on the transparency board with a cover of the image reader; and (b) a step for pressing the reflection original against the transparency board by weight of a bend member which can bend and a resilient member; wherein the bend member is installed in such a way as to be capable of moving up and down in relation to the upper frame and the lower face of the bend member is rough, and the resilient member can move up and down and are located between the upper frame and the bend member.

when reading a transparency original, (a) a step for covering the transparency original placed on the transparency board with a cover of the image reader;

(b) a step for reducing the air pressure in the space formed by the transparency board and the bend member and an airtight member which is installed in the outskirts of the bend member and the lower face of which is below the lower face of the bend member; and (c) a step for pressing the transparency original with the bend member with the effect obtained from reducing the air pressure.

While the novel features of the invention are set forth in detail in the appended claims, the invention, both as to organization and content, will be better understood and appreciated, along with other objects and features thereof, from the following detailed description and accompanied drawings.

DETAILED DESCRIPTION OF THE INVENTION EMBODIMENT

Figure 9:
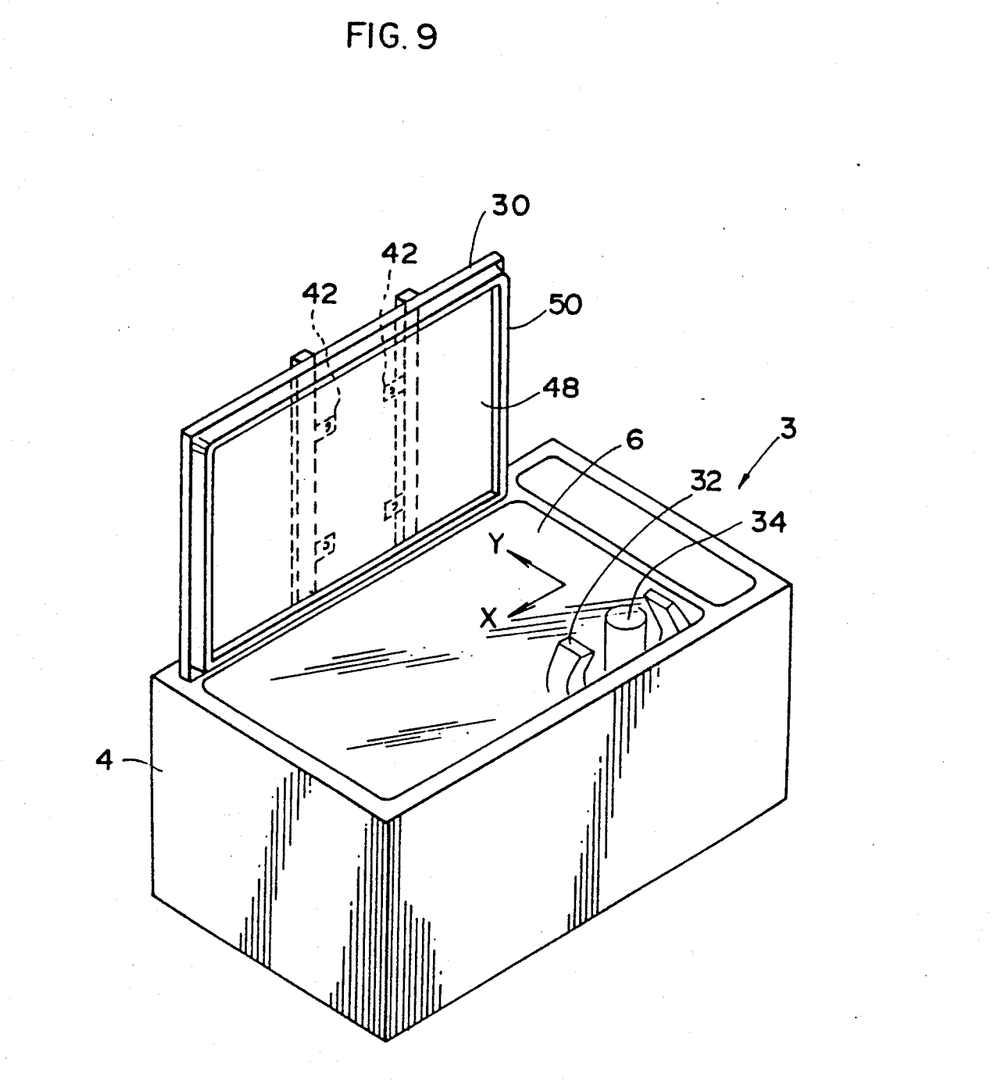
FIG. 9 is a diagram showing an image reader utilizing the cover of an embodiment of the present invention.

FIG. 9 shows the detail of an image reader 3 utilizing a cover 30 of an embodiment of the present invention. A transparency board 6 is located on the top of a body 4. A light source 32 and a light sensor 34 which are located under the transparency board 6 scan an image original in the X and Y direction and generate an image signal. Meanwhile a light source 32 and a light sensor 34 arranged in line may scan an image original in the X or Y the direction only. The total area of the transparency board 6 can be covered with the cover 30.

Figure 6:
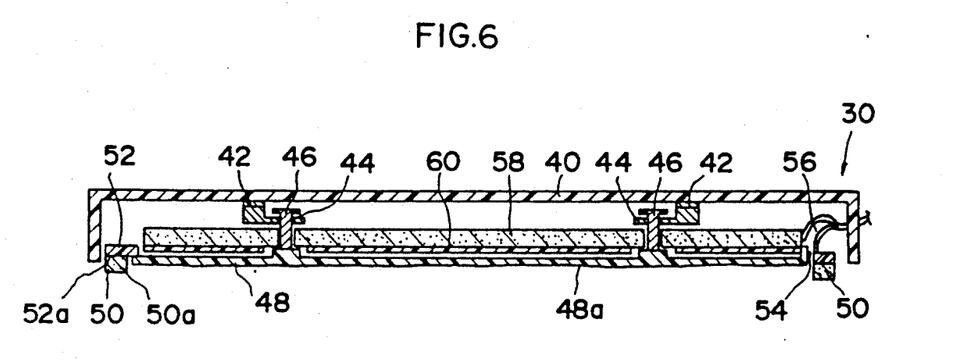
FIG. 6 is a section showing the cover of an embodiment of the present invention which is in lowered position but not contacting the transparency board.

FIG. 6 shows a sectional view of the cover in lowered position but not contacting the transparency board 6. An upper frame 40 which can hardly bend comprises two brackets 42. There is a hole 44 in the bracket 42. A holding member 46 is inserted into the hole 44. The diameter of the head of the holding member 46 is larger than the diameter of the hole 44 so that the holding member 46 cannot pass in its entire length through the hole 44. The lower part of the holding member 46 is threaded.

The lower part of the holding member 46 is screwed into a bend member 48. The bend member 48 may be made of hard vinyl chloride with a thickness of two (2) or three (3) millimeters.

The lower face 48a of the bend member 48 has a rough surface with striped grooves or cross-striped grooves or the like.

In this embodiment, an assistant frame 52 is provided for the installation of an airtight member 50, made of rubber or the like, in the outskirts of the bend member 48. The assistant frame 52 is attached to the upper face of the bend member 48 (refer to FIG. 8) and the airtight member 50 is then attached to the lower face 52a of the assistant frame 52. At that time, the lower face 50a of the airtight member 50 is below the lower face 48a of the bend member 48.

The bend member 48 has a mouth 54. A rubber hose 56 is inserted into and attached to the mouth 54. A vacuum pump, not presented here, is coupled with the rubber hose 56. Reducing the air pressure can be effected by operating the vacuum pump.

Although the bend member 48 is fixed to the holding member 46, it can move up and down to some extent because the holding member 46 is not fixed to the bracket 42.

A resilient member 58 made of sponge or the like is located between the bend member 48 and the bracket 42. A smooth member 60 with a smooth face is bonded tightly to the lower face of the resilient member 58. Meanwhile the smooth member 60 is not bonded to the bend member 48.

The operations of the image reader 3 utilizing the cover 30 will be described hereinafter. It is when the image reader 3 reads a reflection original. In FIG. 9, the reflection original to be read is placed face down on the transparency board 6. Then the reflection original is covered with the cover 30. The detail of this condition is shown in section in FIG. 7. The reflection original 70 is pressed against the transparency board 6 by the weight of the bend member 48 and the resilient member 58. Therefore the bend of the reflection original 70 is adjusted so that the image reader 3 can read the image correctly. Meanwhile even if there is space between the reflection original 70 and the transparency board 6 the image reader 3 can read the image correctly if the space is within the depth of field.

As mentioned above, the image reader 3 is easy to manipulate when the image reader 3 read reads a reflection original.

While it is when the image reader 3 reads a transparency original. In FIG. 9, the transparency original 80 to be read is placed face down on the transparency board 6 and a sheet of white paper 90 is placed on the transparency original 80. Then, the sheet of white paper 90 is covered with the cover 30. The detail of this condition is shown in section in FIG. 3. The transparency original 80 and the white paper 90 are pressed against the transparency board 6 by the weight of the bend member 48 and the resilient member 58. But in this case, there is space 18, as shown in FIG. 2, between the transparency original 80 and the sheet of white paper 90.

Then, reducing the air pressure is effected by operating the vacuum pump (not presented here). At that time the vacuum pump reduces the air pressure in the space 18 as well as that of the space 28 formed by the transparency board 6 and the bend member 48 and the airtight member 50. Then, both the transparency original 80 and the sheet of white paper 90 are presses against the transparency board 6 with the bend member 48 and the space 18 is eliminated. Therefore the image reader 2 can read the transparency original 80 correctly.

As mentioned above, the image reader 3 utilizing the cover 30 realizes the correct and precise reading of the image while at the same time being easy to be manipulated when reading the reflection original 70.

Meanwhile, concerning weight for pressing the reflection original 70 against the transparency board, the thickness of the bend member 48 may be increased so that the bend member 48 will press the reflection original 70 against the transparency board 6. In this case, however, both the transparency original 80 and the white paper 90 can not be pressed against the transparency board 6 with the bend member 48, for in the process of reducing the air pressure, the bend member 48 can not bend so as to fit the upper face of the transparency board 6 which is not quite plane and bent a little.

Therefore, in this embodiment, the thickness of the bend member 48 is kept low, so that the bend member 48 can bend to some extent. Moreover, since the resilient member 58 is installed in the space between the bend member 48 and the upper frame 40, the weight applied to the image original can be increased. In this case, the bend member 48 bends so as to fit the upper face of the transparency board 6, so that both the transparency original 80 and the white paper 90 can be pressed tightly against the transparency board 6. Moreover, in this embodiment, the smooth member 60 is provided for the lower face of the resilient member 58 so that friction between the bend member 48 and the resilient member 58 does not prevent the bend member 48 from bending so as to fit the upper face of the transparency board 6 when the air pressure is being reduced. Meanwhile, in the present embodiment, the sum of the weight of the bend member 48 and the weight of the resilient member 58 is sufficient to press the reflection original 70 tightly against the transparency board 6.

Meanwhile, as the lower face 48a of the bend member 48 is rough, it does not occur that only the part of the sheet of white paper 90 near the rubber hose stick tightly to the transparency original 80 when the air pressure is being reduced. For example, roughening the face of the bend member 48 may be effected by a method such as for graining leather. Provided hard vinyl chloride is used as the bend member 48, the lower face 48a of the hard vinyl chloride is easy to roughen and grained hard vinyl chloride is on the market. Accordingly, the costs of manufacturing can be kept low.

Figure 7:
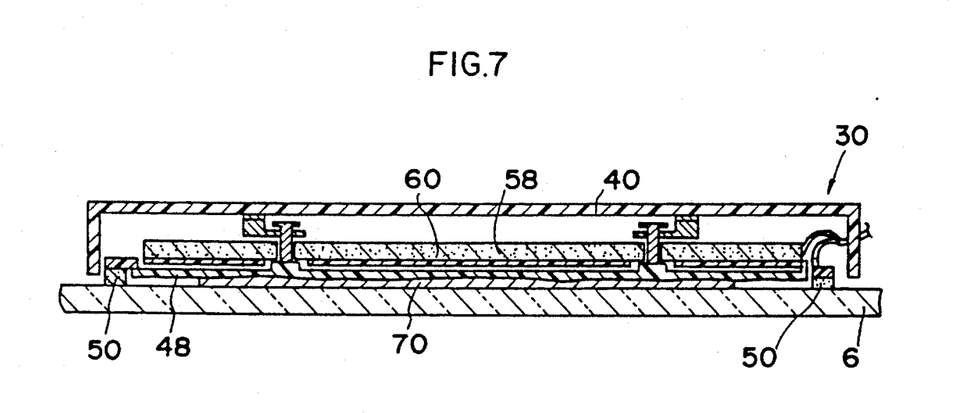
FIG. 7 is a section showing the cover of an embodiment of the present invention with which the reflection original is being covered.
Figure 8:
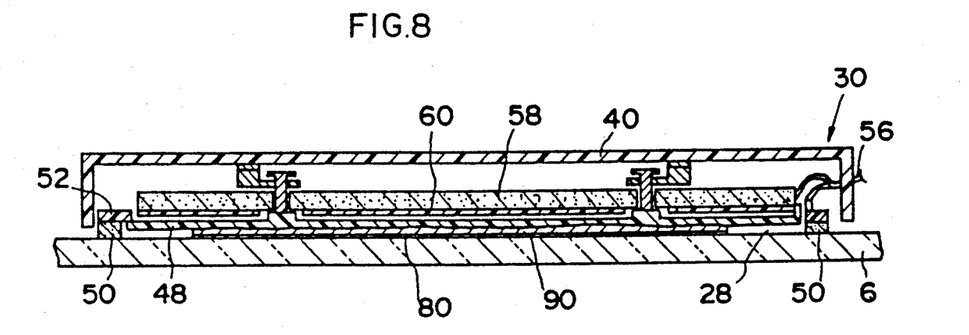
FIG. 8 is a section showing the cover of an embodiment of the present invention with which the transparency original is being covered.
Figure 11:
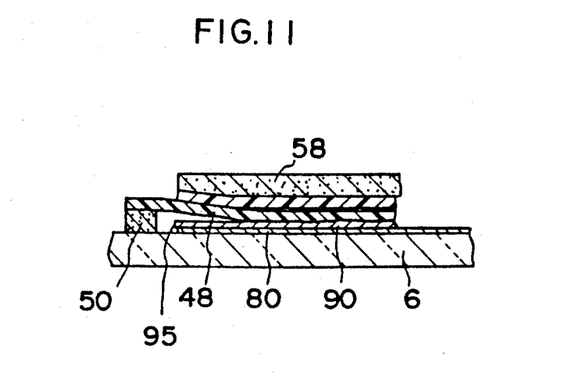
FIG. 11 is a section showing that the airtight member is attached to the lower face of the bend member.

As shown in FIG. 11, the airtight member 50 may be attached to the lower face of the bend member 48. In this case, however, the bend member 48 can not press the sides 95 of the image original tightly against the transparency board 6, especially when the image reader 3 reads an image original as long as the transparency 6. Therefore as shown in FIGS. 6, 7 and 8, it is preferred that the assistant frame 52 is attached to the upper face of the bend member 48 and then the airtight member 50 is attached to the lower face 52a of the assistant frame 52.

Figure 10:
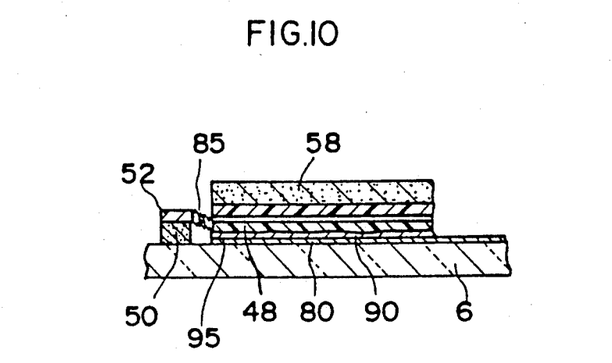
FIG. 10 is a section for showing an other method for connecting the airtight member and the bend member.

For the same purpose, as shown in FIG. 10, a resilient member 85 may connect the assistant frame 52 bonded to the upper face of the airtight member 50 and the bend member 48. If constructed in this way, the bend member 48 can press the sides 95 of the image original tightly against the transparency board 6, even if the thickness of the original changes.

As mentioned above, the cover 30 of the image reader 3 of the present invention comprises the bend member, which is movable up and down to some extent, and the resilient member as weight. Therefore, the cover can press the reflection original tightly against the transparency board. Moreover, the cover 30 can press both the transparency original and the white paper tightly against the transparency board, because the bend member bends adequately when the air pressure is being reduced.

Meanwhile, since the smooth member 60 is provided for the lower face of the resilient member, friction between the bend member 48 and the resilient member 58 does not prevent the bend member 48 from bending so as to fit the upper face of the transparency board 6 when the air pressure is being reduced. That is, the present invention makes available a cover for an image reader that will correctly read image on both a transparency original and a reflection original and yet be easy to manipulate.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What is claimed is:

1. A cover for adjusting a bend of an original, in an image reader which reads reflected light obtained by lighting from underneath a transparency board on which said original is placed, comprising:
   (a) an upper frame;
   (b) a bend member which can bend, having a rough lower face, which is attached to and capable of moving up and down in relation to said upper frame;
   (c) an airtight member installed on a peripheral lower portion of said bend member, a lower face of said airtight member being located below said lower face of said bend member;
   (d) a resilient member which can move up and down, located between said upper frame and said bend member;
   (e) means for withdrawing air by suction to reduce air pressure in a space formed by said transparency board, said bend member, and said airtight member.

2. A cover in accordance with claim 1 wherein the lower face of said resilient member is smooth.

3. A method of adjusting a bend of an original, in an image reader which reads reflected light obtained by lighting from underneath a transparency board on which said original is placed, comprising the following steps:

(a) covering said reflection original set on said transparency board with a cover of said image reader;

(b) pressing said original against said transparency board by weight of a bend member which can bend and a resilient member;

(c) withdrawing air by suction to reduce air pressure in a space formed by said transparency board and said bend member and an airtight member which is installed on a peripheral portion of said bend member, a lower face of said airtight member being located below the lower face of said bend member; and (d) pressing said original with said bend member as a result of reducing the air pressure.

4. A method in accordance with claim 3 wherein the lower face of said resilient member is smooth.

* * * * *